Oct. 18, 1938.   W. T. PRITCHARD   2,133,831
LUBRICATING DEVICE
Filed Aug. 7, 1937   2 Sheets-Sheet 1
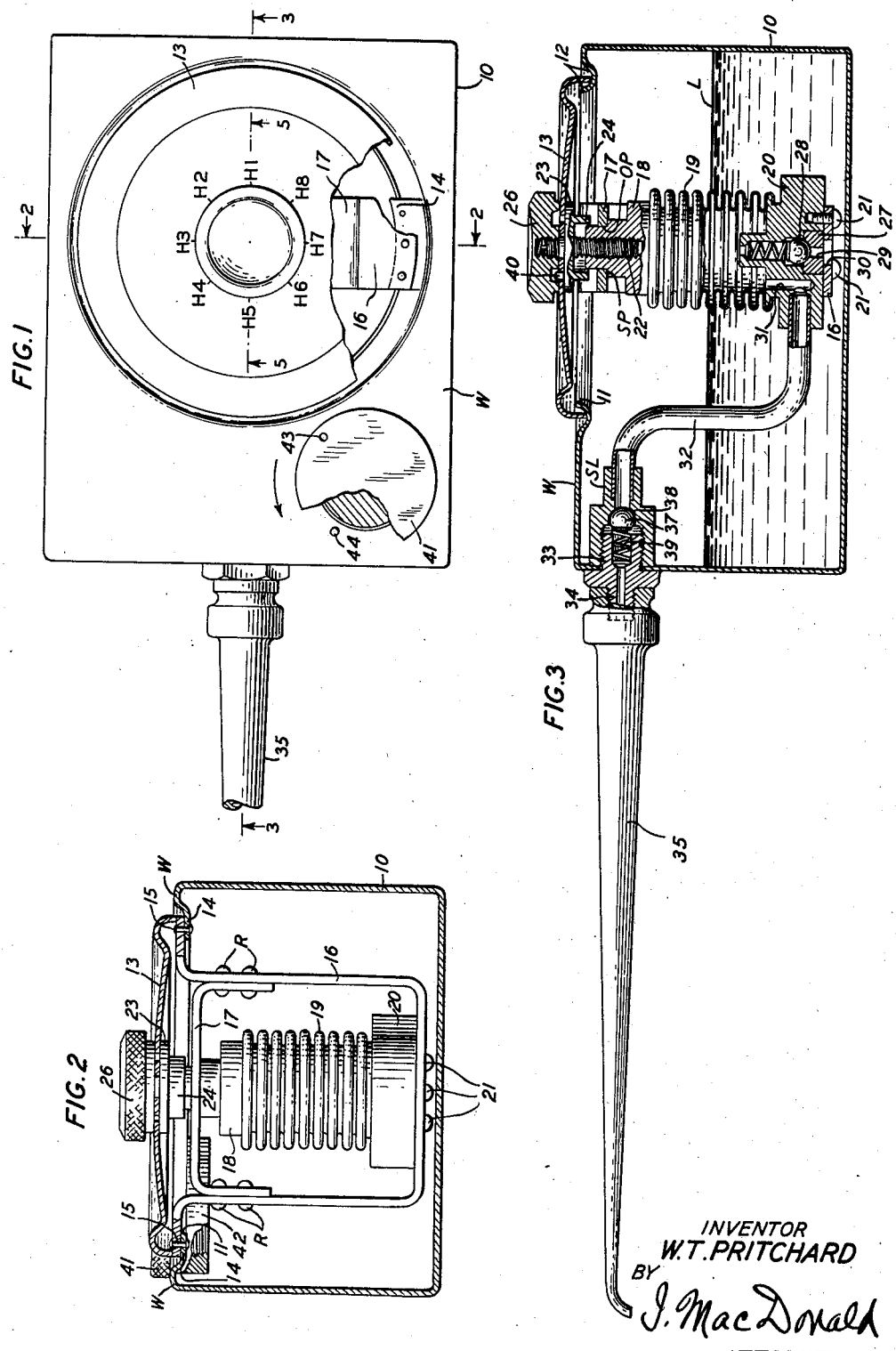
INVENTOR
W.T. PRITCHARD
BY
J. MacDonald
ATTORNEY

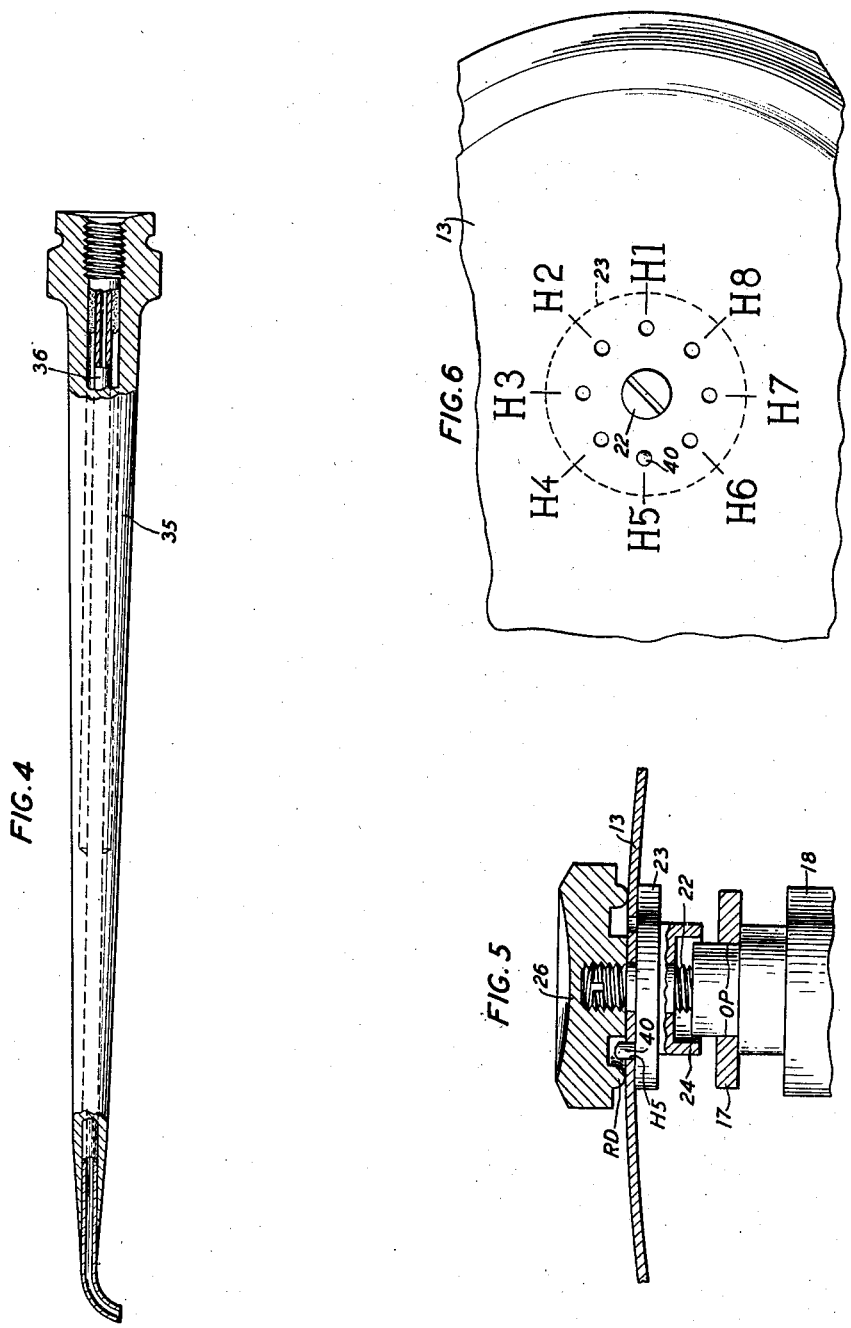

Patented Oct. 18, 1938

2,133,831

UNITED STATES PATENT OFFICE 2,133,831

LUBRICATING DEVICE

William T. Pritchard, Belvidere, N. J., assignor to Bell Telephone Laboratories, Incorporated, New York, N. Y., a corporation of New York Application August 7, 1937, Serial No. 157,872

3 Claims. (Cl. 221—51)

This invention relates to lubricating devices of the type in which the operation of a pump is effective to force a quantity of lubricating fluid through a nozzle upon the operation of a manually operable member.

In the use of lubricating devices of the type above mentioned it has been found that the amount of lubricating fluid ejected varies for each operation of the manually operable member with the result that a great amount of lubricant is ejected on certain machine parts which require only a few drops and that only a few drops of lubricant are ejected on other machine parts requiring a relatively large quantity of lubricant for proper operation of these parts.

The object of the invention is the provision of a lubricating device which will be simple, convenient in use and which may be conveniently adjusted to eject accurately measured quantities of lubricating fluid upon the operation of the manually operable member.

According to this invention a lubricating device is provided in which the operation of a reciprocable member carried or formed with one of the walls of the container is effective to actuate a compressible element in the form of bellows for causing the automatic operation of a system of valves and thereby forcing lubricating fluid through a nozzle connected by a tubing to the compressible member. Means is provided for connecting the compressible element to the reciprocable member, such means being adjustable relative to a stopping member which forms part of a frame disposed in the container and which serves for rigidly securing the stationary end of the compressible element. A key member carried by the adjustable means may be positioned relative to reference marks printed on the reciprocable member for indicating the quantity of lubricant to be delivered to the nozzle for each operation of the reciprocable member where the adjustable means may be locked in such an adjusted position by the key member when engaging one of the registering holes which are disposed in a row adjacent the reference marks on the reciprocable member and a knob which engages a screw threaded portion of the adjustable means serves for securing the reciprocable member to this adjustable means by a clamping action after each adjusting operation.

Other novel features and advantages of the invention will appear from the following description and by the claims appended thereto, reference being had to the accompanying drawings in which:

Fig. 1 is a top view showing a number of operating parts with portions cut away;

Fig. 2 is a cross-sectional view taken on line 2—2 of Fig. 1;

Fig. 3 is a longitudinal sectional view taken on line 3—3 of Fig. 1;

Fig. 4 is an enlarged view of the nozzle shown partly in section;

Fig. 5 is a partial view of the bellows motion adjusting mechanism, showing a number of operating parts in section; and Fig. 6 is a top view thereof shown with portions of the diaphragm cut away and its clamping knob removed.

As shown in Figs. 1, 2 and 3 of the drawings the rectangularly shaped casing 10 has one of its walls W provided with a circular opening 11 disposed concentric to a circular recess 12 registered with the peripheral edge of a metallic concavo-convex diaphragm 13 for securing it therein as by soldering. Two diametrically opposite lugs 14—14 shown in Figs. 1 and 2 extend inwardly from the casing wall W and on them is secured as by rivets 15 the U-shaped frame 16 having a cross-bar 17 secured thereto as by rivets R. This bar is provided with an opening OP (Figs. 3 and 5) for loosely receiving the reduced end portion of a head-piece 18 forming the upper disposed end of a bellows 19, the downward disposed end of this bellows being closed by a head-piece 20 secured to the U-shaped frame 16 by a number of screws 21 shown in Figs. 2 and 3.

The diaphragm 13 is operatively connected to the head-piece 18 of bellows 19 by an adjustable screw 22 which is formed adjacent one of its ends with a disc portion 23 carrying a pin or key member 40 provided for engaging, as shown in Figs. 3, 5 and 6, any one of the circularly disposed holes H—1, H—2, H—3, H—4, H—5, H—6, H—7, H—8 in the diaphragm 13 for holding the screw 22 in each adjusted position which is printed on the diaphragm 13 as shown in Figs. 1 and 6.

Diaphragm 13 is clamped between the disc portion 23 of screw 22 by a knob 26 threadedly engaging the opposite end of screw 22 so that the movement of the diaphragm as imparted by a pressure applied on the knob 26 is effective to compress the bellows 19 an amount corresponding to the adjustment of screw 22, the downward movement of diaphragm 13 and the bellows 19 actuated thereby for each adjusted position of screw 22 being controlled by a stop afforded by a rim portion 24 laterally extending from the disc portion 23 of screw 22 and the cross-bar 17 while the upward movement of the diaphragm 13 and the bellows 19 is limited by the engagement of the shoulder portion SP of head-piece 18 with the under-side of cross-bar 17, the stiffness of bellows 19 being such as to spring back to its normal position against the resistance or resilience of diaphragm 13 after each successive operation.

The lower disposed head-piece 20 of bellows 19 is provided with a valve seat 27 for receiving a spring pressed ball 28, the valve seat 27 having an opening 29 registering with an opening 30 in the U-shaped frame 16 for connecting the interior of bellows 19 to the interior of casing 10. A hole 31 in the head-piece 20 connects the interior of bellows 19 to a tubing 32 having its other end secured to the sleeve SL of a two-part connector member 33 secured at the top disposed end of one of the vertical walls of casing 10 as shown in Fig. 3. This connector is provided with a screw threaded portion 34 for receiving a nozzle 35 drilled longitudinally for receiving a relatively small tubing 36 shown in Fig. 4 through which the lubricating fluid is ejected from the casing subsequent to its passing through a valve which consists of a ball 37 normally held by a spring 39 against its seat 38 formed adjacent the sleeve portion SL of connector 33.

The casing 10 may be filled with lubricating fluid to any desired level above the valve formed by the spring pressed ball 28 and valve seat 27 by unscrewing a plug 41 (shown in Figs. 1 and 2) from a similarly threaded sleeve 42 which may be formed with the casing 10 or secured thereto.

The plug 41 as shown in Fig. 1 is provided with a hole 43 which, when this plug is turned a small angular distance counter-clockwise from its tightened position, registers with a hole 44 in the sleeve 42 for permitting the entrance of air in the casing above the level of lubricating fluid so as to prevent the formation of a partial vacuum therein after a certain number of lubricating operations.

With lubricating fluid in the casing 10, for example, to the level marked L in Fig. 3, the bellows 19 may be filled with lubricating fluid prior to the use of the device by a number of successive reciprocating movements of diaphragm 13. The downward movement of the diaphragm and the consequent compression of bellows 19 are effective to first expel the air from the bellows through the hole 31, the pipe 32, and the valve formed by the ball 37 and its seat 38, the valve formed by ball 38 and its seat 27 being closed during the downward stroke of the diaphragm and that of the bellows 19. Upon the return stroke of bellows 19 and the diaphragm 13 to normal position under the media of their own tension this movement is effective to cause a vacuum in the bellows for automatically lifting the ball 28 from its seat to permit the entrance of lubricating oil into the bellows 19, the ball 37 during the return movement of bellows 19 remaining in normal closed position partly due to the tension of spring 39 and the vacuum caused by the return movement of the bellows 19, this operation being repeated until all the air contained in the bellows 19, the pipe 32 and nozzle has been replaced by lubricating fluid.

Under this condition and considering the screw 22 angularly adjusted so that the pin 40 engages the hole H—5 in the diaphragm 13 as shown in Figs. 3 and 6, a pressure applied to the knob 26 is effective to flex the diaphragm 13 and compress the bellows 19 connected thereto an amount equal to the adjusted space or distance between the cross-bar 17 and the abutting end of rim 24. The lubricating fluid which fills the bellows 19 is thus compressed and forced to flow to the nozzle 35 through a path including the hole 31 in the head-piece 20, tubing 32 for automatically opening the valve formed by the ball 37 and seat 38 and hence to the tubing 36 of nozzle 35.

The adjustment of the device as to obtain a quantity of lubricating fluid corresponding to the position H—1, H—2, H—3, etc., is conveniently effected by (1) unscrewing the knob 26 from the top end portion of screw 22; (2) inserting a screw driver into the slot at the end of this screw for pressing it downwardly and thereby disengaging the pin 40 from the diaphragm 13; and (3) turning the screw 22 for reengaging the pin 40 with any one of the holes H—1, H—2, etc., after which the knob 26 is screwed tight for clamping the diaphragm 13 between this knob and the disc portion 23 of screw 22, thus preparing the device for use to any of the lubricating adjustments desired.

In the device of the invention the positive stop afforded by the bar 17 and the shoulder portion SP accurately limits the upward movement of the bellows against its own tension and the stop afforded by the bar 17 and the rim portion 24 formed with disc 23 of screw 22 for any adjustment of this screw, provides a positive stop for the downward movement of the bellows so that the quantity of lubricating fluid desired is accurately controlled and while the positions H—1, H—2, H—3, etc., indicated on the diaphragm are meant to indicate one, two, three, four, five, six, seven and eight drops of lubricant, the pitch of screw 22 may be changed so that its angular adjustment to the position H—1, H—2, H—3, etc., or subdivision thereof, will change the space between the abutting end of rim 24 relative to bar 17 to correspond to any number of oil drops or other measure desired.

What is claimed is:

1. In a lubricating device, a container having a plurality of walls, one of said walls having an opening, a diaphragm closing said opening, a rectangularly shaped frame secured to the last-mentioned wall and extending into said container, a bellows having a head-piece at each end, one of said head-pieces being secured to said diaphragm and the other to said frame, a nozzle connecting the last-mentioned head-piece to the outside of said container, and a system of valves, one of said valves being disposed in the last-mentioned head-piece and the other in said nozzle for pumping the lubricating fluid from said container to said nozzle upon the operation of the first-mentioned head-piece by the movement of said diaphragm.

2. In a lubricating device, a container having a plurality of walls, one of said walls having an opening, a diaphragm closing said opening, a rectangularly shaped frame secured to the last-mentioned wall and extending into said container, a bellows, a head-piece secured at each end thereof, one of said head-pieces being secured to said diaphragm and the other to said frame, a tubing connecting the last-mentioned head-piece to the outside of said container, a system of valves, one of said valves being disposed in the last-mentioned head-piece and the other adjacent one end of said nozzle for pumping the lubricating fluid from said container to said nozzle upon the operation of said bellows by the operation of said diaphragm, and means adjustably disposed between said frame and said diaphragm for controlling the operation of said bellows and thereby the flow of lubricating fluid through said nozzle.

3. In a lubricating device, a container having side walls, a bottom and a top wall, said top wall having an opening, a reciprocable diaphragm closing said opening, a pair of lug members carried by said container and extending radially in the opening thereof, a frame secured to said lug members, a bellows, a head-piece secured at each end of said bellows, means for securing one of said head-pieces to said frame, adjustable means for securing the other of said head-pieces to said diaphragm, means in the last-mentioned head-piece engaging means carried by said frame for guiding the last-mentioned head-piece upon the reciprocating operation of said diaphragm, a valve in one of said head-pieces for permitting the entrance of lubricating fluid from said container to said bellows upon the movement of the latter, a connector member secured to one of the side walls of said container having means for receiving a nozzle, a tubing connecting the last-mentioned head piece and said connector, a valve in said connector for permitting the flow of lubricating fluid to said nozzle upon another movement of said bellows, and means carried by said frame cooperating with said adjustable means for controlling the flow of lubricating fluid from said container to said nozzle.

WILLIAM T. PRITCHARD.